Jan. 11, 1949.   J. WINKLER   2,458,815
TOOL HANDLE CONNECTION
Filed Jan. 21, 1946
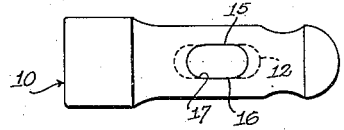
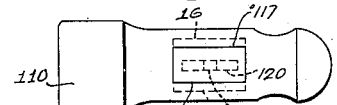
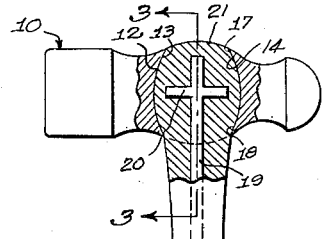
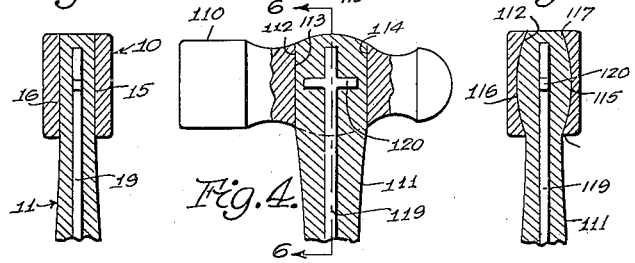
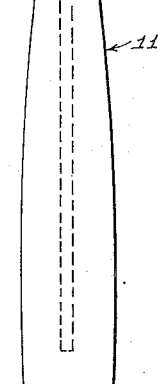
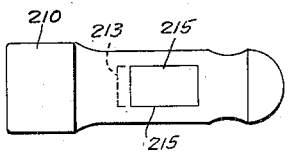
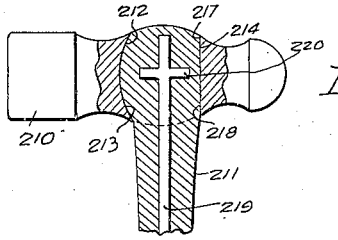
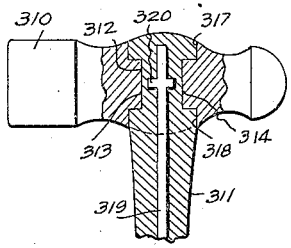
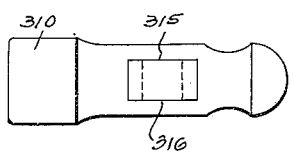
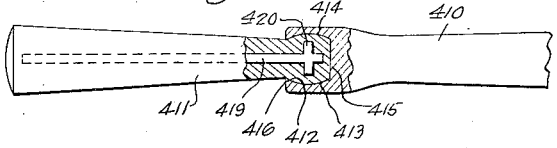
INVENTOR.
Julius Winkler
BY Barthel & Bugbee
ATT'YS Patented Jan. 11, 1949

2,458,815

UNITED STATES PATENT OFFICE 2,458,815

TOOL HANDLE CONNECTION

Julius Winkler, Detroit, Mich.

Application January 21, 1946, Serial No. 642,536

8 Claims. (Cl. 306—32)

This invention relates to hand tools, and in particular to means for connecting the handles thereof to the head or other operating portion of the tool, and is especially applicable to hammers, chisels and the like.

One object of this invention is to provide an improved tool handle connection for hand tools, wherein the handle is molded into a suitable cavity in the tool head or other operating portion thereof, such as the shank.

Another object is to provide an improved tool handle connection wherein the tool head or other operating portion is provided with a cavity having a larger cross-sectional area than the aperture at which the handle enters the tool head or shank.

Another object is to provide a tool handle connection, as set forth in the preceding objects wherein the cavity in longitudinal section is barrel-shaped or partially barrel-shaped.

Another object is to provide a tool handle connection as set forth in the preceding objects wherein the handle is reinforced by a strengthening member, such as a metal rod which enters the cavity in the tool head or shank and which preferably has an enlargement such as a cross bar therein.

Another object is to provide a tool handle connection wherein the cavity has enlarged apertures at the top and bottom of the head and a reduced diameter bore extending therebetween.

Another object is to provide an improved tool handle connection as set forth in the preceding objects wherein the configuration of the head or shank cavity and the mating portion of the handle is such that the handle is firmly locked to the head or shank of the tool, thereby preventing accidents from the head of the tool flying off during use and also reducing the time in which such tools are not usable because of such breakage or loss of the head.

Other objects and advantages of the invention will become apparent during the course of the following description of the accompanying drawing, wherein:

Figure 1 is a side elevation, partly in section, of a hand tool showing the improved tool handle connection according to a preferred embodiment of the invention;

Figure 2 is a top plan view of the hand tool shown in Figure 1;

Figure 3 is a longitudinal section taken along the line 3—3 in Figure 1;

Figure 4 is a fragmentary side elevation of a hand tool similar to Figure 1, but showing a modified tool handle connection;

Figure 5 is a top plan view of the tool shown in Figure 4;

Figure 6 is a longitudinal section taken along the line 6—6 in Figure 4;

Figure 7 is a fragmentary side elevation of a hand tool similar to Figures 1 and 4 but showing a further modification;

Figure 8 is a top plan view of the hand tool shown in Figure 7;

Figure 9 is a fragmentary side elevation of a hand tool similar to Figures 1, 4 and 7 but showing a still further modification;

Figure 10 is a top plan view of the hand tool shown in Figure 9; and

Figure 11 is a side elevation, partly in longitudinal section, of a further modification showing the invention as applied to a hand tool with a shank such as a chisel.

Referring to the drawings in detail, Figure 1 shows a hand tool, generally having a head 10 and handle 11, a hammer being chosen for purposes of illustration. The head 10 is provided with a cavity 12 therein having arcuately curved ends 13 and 14 resembling a barrel in configuration. The cavity 12 is preferably elongated and provided with relatively flat sides 15 and 16 (Figure 2). In this manner, the apertures 17 and 18 at the top and bottom of the head 10 are of smaller cross-sectional area than of the cavity 12 at its midportion.

The handle 11 is preferably of moldable plastic material and is molded directly into the cavity 12 by any suitable machine and process, such as in a plastic injection molding machine of a type known to the plastic molding industry. The handle 11 is preferably reinforced by a reinforcing member 19 extending substantially throughout the length of the handle 11 and extending into the cavity 12 where it is optionally provided with an enlargement such as a cross bar 20 (Figure 1).

In this manner, the upper portion 21 of the handle 11 is firmly and permanently locked within the cavity 12 and can neither be twisted relatively to the head 10 nor extracted therefrom. At the same time moreover, the plastic handle 11, being both electrically insulating and a relatively poor heat conductor, enables the tool to be used around electrically conducting material or highly heated material without danger of electric shock or burns to the user. Moreover, the plastic handle 11 is also somewhat resilient and hence transmits shock to a lesser extent than, for example, a metal handle. The plastic handle 11 also is highly resistant to weathering and will not rot or crack. The tool may therefore be stored in damp places without deterioration of the handle and consequently without weakening thereof, aside from some corrosion which might occur. Such a tool with a molded plastic handle according to the invention, would be particularly useful, for example, for chipping hammers and the like which are used in removing paint and rust from the hulls, deck machinery, superstructure and rigging of ships. It would also be useful for tools which are stored in life boats, motor launches or ordinary small water craft, including sailing vessels.

The modification shown in Figures 4 to 6 inclusive is generally similar to that shown in Figure 1. In this modification, the head 110 and handle 111 are provided with a cavity 112 having relatively straight forward and rearward ends 113 and 114, but with sides 115 and 116 which are arcuately curved in approximately barrel-shaped form. The top and bottom apertures 117 and 118 are of approximately rectangular cross-section which is smaller in cross-sectional area than the intermediate cross-section of the cavity 112. A reinforcement 119 with a cross bar or other enlargement 120 is also optionally provided for the purpose explained in connection with Figures 1 to 3 inclusive. The use and advantages of the tool and its mode of manufacture are similar to those described in connection with the principal form of the invention, and hence require no further explanation.

The modification shown in Figures 7 and 8 is similar to the modification shown in Figures 4 to 6 inclusive in that it has a head 210 and handle 211, the head being provided with a cavity 212 having a curved forward edge 213 and a straight rearward edge 214, the sides 215 and 216 being substantially flat. As before, the upper and lower apertures 217 and 218 are rectangular in outline and of smaller cross-sectional area than the intermediate cross-sectional area of the cavity 212, thereby preventing withdrawal of the handle 211 from the head 210 and preventing accidental dislodgement thereof. A reinforcement 219—220 is also provided for the handle 211, as in the previous forms of the invention.

The modification shown in Figures 9 and 10 consists of a head 310 having a handle 311 secured in a cavity 312 having stepped forward and rearward ends 313 and 314 and approximately straight sides 315 and 316. The upper and lower apertures 317 and 318, however, are of approximately rectangular outline but are of larger cross-sectional area than the intermediate cross-sectional area of the cavity 312. This construction likewise prevents withdrawal or accidental dislodgement of the handle from the cavity 312. A reinforcement 319—320 may likewise be provided as in the previous forms of the invention.

The modification shown in Figure 11 shows a shank 410 of a hand tool, such as a chisel, with a handle 411. The shank 410 is provided with a socket 412 having oppositely curved walls 413 and 414 of approximately barrel-shaped cross-section, thereby preventing withdrawal of the handle 411. The inner end 415 and outer aperture 416 of the cavity 412 are of smaller cross-sectional area than the intermediate cross-sectional area of the cavity 412, this construction firmly locking the end of the handle 411 in the cavity 412 of the shank 410. A handle reinforcement 419—420 may optionally be provided, in the manner similar to that explained in connection with the previous forms of the invention, and similarly installed.

In all forms of the invention, there is thus provided a tool handle connection wherein a moldable plastic handle is molded directly into a cavity in the head or shank, together with a reinforcement, if desired. In all forms, the cross-sectional area at the aperture or apertures of the cavity is different from that of the intermediate portion of the cavity. In all forms but that shown in Figures 9 and 10, the intermediate cross-sectional area is greater than that of the aperture or apertures at opposite ends of the cavity. As previously stated, the handle may be molded into the head in the dies of a plastic injection molding machine, the reinforcement being suitably supported within the head cavity during the molding operation. The use of the tools shown in the various modifications is similar to that of other tools of the same class.

While I have shown and described my invention in detail, it is to be understood that the same is to be limited only by the appended claims, for many changes may be made without departing from the spirit and scope of my invention.

What I claim is:

1. A hammer comprising an elongated head having a transverse internally-enlarged cavity therein with a plurality of spaced handle inlet and outlet openings of smaller cross-sectional dimension than the internal cross-sectional dimension of said cavity, and a moldable plastic handle having its end portion within said cavity and filling the space therein whereby to prevent withdrawal of said handle from said tool portion.

2. A hammer comprising an elongated head having a transverse cavity therein with a plurality of spaced handle inlet and outlet portions of substantially equal cross-sectional dimension but of different cross-sectional dimensions from the internal cross-sectional dimension of said cavity, and a moldable plastic handle having its end portion within said cavity and filling the space therein whereby to prevent withdrawal of said handle from said tool portion.

3. A hammer comprising an elongated head having a transverse internally-enlarged cavity therein, with handle inlet and outlet openings of smaller cross-sectional dimension than the internal cross-sectional dimension of said cavity, a moldable plastic handle having its end portion within said cavity and filling the space therein whereby to prevent withdrawal of said handle from said tool portion, and an elongated metallic reinforcing member embedded within said handle and extending longitudinally therealong into said cavity.

4. A hammer comprising an elongated head having a transverse internally-enlarged cavity therein with a centrally enlarged portion tapering toward a smaller handle entrance portion, said cavity in longitudinal section having oppositely curved arcuate walls in at least one plane thereof, and a moldable plastic handle having its end portion substantially filling said cavity whereby to prevent withdrawal of said handle from said tool portion.

5. A hammer comprising an elongated head having a transverse internally-enlarged cavity therein with a centrally enlarged portion tapering toward a smaller handle entrance portion, said cavity having oppositely curved arcuate walls in a plane including the longitudinal axis of the handle and longitudinal axis of the head of the tool, and a moldable plastic handle having its end portion substantially filling said cavity whereby to prevent withdrawal of said handle from said tool portion.

6. A hammer comprising an elongated head having a transverse internally-enlarged cavity therein with a centrally enlarged portion tapering toward a smaller handle entrance portion, said cavity having oppositely curved arcuate walls in a plane transverse to a plane including the longitudinal axis of the handle and the longitudinal axis of the head of the tool, and a moldable plastic handle having its end portion substantially filling said cavity whereby to prevent withdrawal of said handle from said tool portion.

7. A hammer comprising an elongated head having a transverse internally-enlarged cavity therein with a centrally enlarged portion tapering toward a smaller handle entrance portion, said cavity having an arcuate wall on one side thereof in a plane including the handle and longitudinal axis of the head of the tool, and a moldable plastic handle having its end portion substantially filling said cavity whereby to prevent withdrawal of said handle from said tool portion.

8. A hammer comprising an elongated head having a transverse internally-constricted bore therethrough which enlarged entrance portions and a reduced diameter connecting portion extending between said entrance portions, and a moldable plastic handle having its end portion substantially filling said bore.

JULIUS WINKLER.

REFERENCES CITED

The following references are of record in the file of this patent:

UNITED STATES PATENTS

| Number | Name | Date |
| --- | --- | --- |
| 479,102 | Willbrandt | July 19, 1892 |
| 1,304,647 | Basta | May 27, 1919 |
| 1,685,588 | Hemming | Sept. 25, 1929 |
| 2,382,304 | Foltz | Aug. 14, 1945 |

FOREIGN PATENTS

| Number | Country | Date |
| --- | --- | --- |
| 513,402 | Great Britain | Oct. 11, 1939 |